US010049197B2

(12) United States Patent
    Roos

(10) Patent No.: US 10,049,197 B2
(45) Date of Patent: Aug. 14, 2018

(54) SYSTEM AND METHODS FOR PERSONAL IDENTIFICATION NUMBER AUTHENTICATION AND VERIFICATION

(71) Applicant: KnuEdge Incorporated, San Diego, CA (US)

(72) Inventor: Derrick Roos, San Diego, CA (US)

(73) Assignee: KnuEdge Incorporated, San Diego, CA (US)

(*) Notice: Subject to any disclaimer, the term of this patent is extended or adjusted under 35 U.S.C. 154(b) by 247 days.

(21) Appl. No.: 14/331,183

(22) Filed: Jul. 14, 2014

(65) Prior Publication Data
    US 2016/0012823 A1    Jan. 14, 2016

(51) Int. Cl.

| | | |
|---|---|---|
| G06F 21/32 | (2013.01) | |
| G10L 17/24 | (2013.01) | |
| G06F 21/31 | (2013.01) | |
| G06F 21/36 | (2013.01) | |
| G07F 19/00 | (2006.01) | |
| G06Q 20/40 | (2012.01) | |
| G07F 7/10 | (2006.01) | |
| H04L 9/32 | (2006.01) | |

(52) U.S. Cl.
    CPC ............... *G06F 21/32* (2013.01); *G06F 21/31* (2013.01); *G06F 21/36* (2013.01); *G06Q 20/40145* (2013.01); *G07F 7/1033* (2013.01); *G07F 19/201* (2013.01); *G10L 17/24* (2013.01); *H04L 9/3231* (2013.01); *H04L 9/3271* (2013.01); *H04L 9/3226* (2013.01)

(58) Field of Classification Search
    CPC . G06F 21/31; G06F 2221/2113; G06Q 20/40; G06Q 20/4012
    See application file for complete search history.

(56) References Cited

U.S. PATENT DOCUMENTS 6,236,967 B1 * 5/2001 Brotman ............. H04M 3/4936
                                                    379/88.01
8,694,315 B1 * 4/2014 Sheets ............... G06Q 20/40145
                                                      704/246
2002/0035539 A1    3/2002 O'Connell ...................... 705/39
(Continued)

FOREIGN PATENT DOCUMENTS

EP         1320083 A1    6/2003
WO    WO2011124267 A1   10/2011

OTHER PUBLICATIONS

International Application No. PCT/US2015/040320, Notification of Transmittal of International Search Report and Written Opinion of the International Searching Authority, dated Sep. 29, 2015, 12 pages.

*Primary Examiner* — Douglas Godbold
*Assistant Examiner* — Mark Villena
(74) *Attorney, Agent, or Firm* — Fish & Richardson P.C.

(57) ABSTRACT

Systems and methods to authenticate and verify user access replace the digits of a personal identification number (PIN) of a particular user with prompted randomized words that are to be uttered by an unidentified user. By virtue of this replacement, the PIN remains secret. A known speaker provides voice samples to the system in advance. The words uttered by the unidentified user (in response to the prompted words being displayed) correspond to digits. The uttered words are checked against the PIN, and are used to verify if the unidentified user's voice matches the voice of the known speaker.

20 Claims, 5 Drawing Sheets

(56) References Cited

U.S. PATENT DOCUMENTS

| | | | |
|---|---|---|---|
| 2009/0037986 A1 | 2/2009 | Baker | |
| 2009/0117942 A1* | 5/2009 | Boningue | H04M 1/72547 |
| | | | 455/564 |
| 2009/0302103 A1 | 12/2009 | Kolinski-Schultz | |
| 2010/0024022 A1* | 1/2010 | Wells | H04L 63/0838 |
| | | | 726/7 |
| 2010/0076891 A1* | 3/2010 | Vanmoor | G06Q 20/04 |
| | | | 705/44 |
| 2011/0090097 A1* | 4/2011 | Beshke | B60R 25/23 |
| | | | 341/20 |
| 2012/0130714 A1 | 5/2012 | Zeljkovic et al. | 704/235 |
| 2013/0132091 A1* | 5/2013 | Skerpac | G10L 17/005 |
| | | | 704/273 |
| 2013/0159196 A1 | 6/2013 | Dizoglio | 705/72 |
| 2013/0291096 A1* | 10/2013 | Finnan | G06F 21/31 |
| | | | 726/19 |
| 2014/0046664 A1* | 2/2014 | Sarkar | H04W 12/06 |
| | | | 704/246 |
| 2014/0130127 A1 | 5/2014 | Toole | |
| 2014/0164782 A1* | 6/2014 | Lo | G06F 21/35 |
| | | | 713/184 |
| 2014/0179283 A1* | 6/2014 | Kwon | H04W 4/16 |
| | | | 455/414.1 |
| 2014/0283022 A1* | 9/2014 | Beloncik | G06F 21/32 |
| | | | 726/19 |
| 2014/0343943 A1* | 11/2014 | Al-Telmissani | G10L 17/00 |
| | | | 704/246 |

* cited by examiner

| 1<br>cat | 2<br>dog | 3<br>huddle |
|---|---|---|
| 4<br>orange | 5<br>shimmer | 6<br>circle |
| 7<br>trouble | 8<br>alpha | 9<br>bingo |
| *<br>robot | 0<br>vanish | #<br>fish |

301 — FIG. 3A

| 1<br>orange | 2<br>shimmer | 3<br>circle |
|---|---|---|
| 4<br>dog | 5<br>cat | 6<br>brittle |
| 7<br>flagstaff | 8<br>bromide | 9<br>traction |
| *<br>romeo | 0<br>take | #<br>wheel |

302 — FIG. 3B

| 1<br>cat | 2<br>doll | 3<br>muddy |
|---|---|---|
| 4<br>orange | 5<br>simmer | 6<br>riddle |
| 7<br>trout | 8<br>aloe | 9<br>band |
| *<br>thanks | 0<br>for | #<br>fish |

303 — FIG. 3C

| 1<br>flagstaff | 2<br>bromide | 3<br>traction |
|---|---|---|
| 4<br>bromide | 5<br>circle | 6<br>orange |
| 7<br>orange | 8<br>shimmer | 9<br>circle |
| *<br>traction | 0<br>cat | #<br>flagstaff |

304 — FIG. 3D

SYSTEM AND METHODS FOR PERSONAL IDENTIFICATION NUMBER AUTHENTICATION AND VERIFICATION

FIELD OF THE INVENTION

The invention relates to authentication and verification based on the usage of personal identification numbers, and, in particular, systems and methods that prevent a personal identification number from being shared, stolen, and/or otherwise used inappropriately to gain access to a secure system.

BACKGROUND OF THE INVENTION

Secure systems are systems that limit access in one or more ways. Secure systems may include physical secure systems, including but not limited to automated teller machines (ATMs), electronically locked doors, and/or other physical secure systems, as well as virtual secure systems, including but not limited to online access to a particular website, an account on a website, a particular area within a website, and/or other virtual secure systems. One commonly employed security measure for access to secure systems is a personal identification number, or PIN. Known examples include a bankcard or debit card that requires a particular personal identification number before a (financial) transaction can be initiated and/or completed.

Some secure systems employ speech recognition technology. Speech recognition commonly uses one or more recorded audio files from a particular speaker that include sound generated by that speaker. Through analysis and/or signal processing, a speech recognition system may determine which word or phrase the particular speaker uttered, and/or whether the utterance matches a predetermined passphrase, password, and/or other utterance that has been predetermined to grant a speaker access to the secure system.

Some secure systems employ voice recognition technology (also referred to as speaker verification technology). Speaker verification commonly uses recorded audio files that include sound generated by one or more people (also referred to herein as speakers). Based on one or more audio files, one or more audio characteristics and/or parameters may be assessed per speaker. A set of audio characteristics, together with any other information that may be useful to characterize and/or identify a particular speaker, may form the basis of a model of the particular speaker (for example, a parameterized model may represent a particular speaker). Models of speakers may be used to assess, estimate, determine, and/or otherwise reach a decision on whether a particular recorded audio file (or a particular speaker model) appears to represent a known speaker, and/or which known speaker in particular.

In some implementations, speakers may be represented by speaker models including sets and/or vectors or values and/or coefficients. By way of non-limiting example, some speaker verification systems may be based on speaker models that include fixed-length vectors. As used herein, a fixed-length vector may refer to a vector having the same number (or a similar number) of values and/or coefficients regardless of the number and/or length of the recorded audio files associated with the particular speaker represented by the particular model that includes the fixed-length vector.

SUMMARY

One aspect of the disclosure relates to systems and methods for authentication and verification, e.g. in the context of user access to a secure system. Prior to being authenticated and verified, a user is considered and referred to as an unidentified user. An unidentified user may request access, e.g. to a secure system. As part of this request, the unidentified user may present information to the system for authentication and verification (also referred to as the system). The presented information may include a claim of who the unidentified user is, and/or to which group or class of people the unidentified user belongs. Such a claim may be referred to as an identity claim, and the user making such a claim may be referred to as the claimed user. For example, at an ATM, a user may present a card (e.g. a bankcard and/or debit card). Mere possession of the card may not be sufficient to grant the user access to perform financial transactions (e.g. a withdrawal) using the ATM. Mere presentation of the card (e.g. by inserting the card into the ATM) may not be sufficient to grant the user access to perform financial transactions. In some implementations, information may be presented to the system for authentication and verification through a voice command, an access code, a user identification, an email-address, a mailing address, an identification number, a social security number, an account number, a name of an account holder, and/or through other ways in which a user can present information to the system that include, implicitly or otherwise, an identity claim.

In some implementations, responsive to a request for access, a presentation of information, and/or a presentation of an identity claim, the system for authentication and verification may be configured to obtain a target personal identification sequence (e.g. a target PIN) that is associated with a particular user, in particular the claimed user. The system may grant access to the unidentified user responsive to, among other conditions described in this disclosure, the unidentified user entering and/or providing a personal identification sequence that matches the specific target personal identification sequence that is associated with the claimed user.

The system may include one or more servers, one or more physical processors (interchangeably referred to herein as "processors"), one or more computer program components, physical storage media (interchangeably referred to herein as "storage"), one or more interfaces, and/or other components.

Users may interact with the system through client computing platforms, interfaces, and/or other components. Client computing platforms may include one or more processors configured to execute computer program components. The computer program components may be configured to enable a user associated with a client computing platform to interact with the system, any component thereof, other client computing platforms, and/or provide other functionality attributed herein to client computing platforms.

The one or more servers included in the system may include one or more processors configured to provide information-processing capabilities and execute computer program components. The system may be configured to process and/or exchange information, including but not limited to processing and/or exchanging information by executing computer program components. The computer program components may include one or more of a personal identification component, a mapping component, a target prompt component, a presentation component, an audio component, a prompt authentication component, a speaker verification component, an access component, a time component, an audio characteristics component, and/or other components.

The personal identification component may be configured to obtain and/or determine target personal identification sequences, including but not limited to personal identification numbers. In some implementations, personal identification sequences may include one or more of letters, numbers, alphanumeric characters, symbols, special characters, and/or other characters. Individual target personal identification sequences may be associated with individual users. If a user enters a PIN publicly, as may be common in some cases when using an ATM, the user's PIN may not remain secret. For example, a nearby on-looker could learn the user's PIN by watching the user enter the PIN.

The mapping component may be configured to obtain, generate, and/or determine mappings between user-selectable input options (e.g. input options available for selection by users through client computing platforms, interfaces, and/or other components) and prompts that represent words. By way of non-limiting example, user-selectable input options may include buttons, keys, selectable fields in a user interface, and/or other input options available for selection by users, including but not limited to input options on a keypad, keyboard, panel, touch screen, and/or other implementation of a user interface. Mappings may be implemented as a set of associations and/or correspondencies. For example, in some implementations, the user-selectable input options include the digits from zero to nine. A mapping may be defined as an association of each of the individual ones of the digits from zero to nine to a particular prompt. New mappings may be obtained, generated, and/or determined as needed, e.g. for each attempt to authenticate and verify a particular user, and/or for each number, latter, symbol, object, and/or other item in a personal identification sequence.

Prompts may include visual, graphic, textual, auditory, and/or otherwise sensory representations of words, concepts, numbers, and/or other objects. As an example, a set of prompts may include a set of words that indicate different colors, such as "red," "blue, "green," orange," etc. A mapping may be defined in which the number 0 is associated with the word "orange," 1 with "blue," 2 with "green," 3 with "red," and so forth. Based on this mapping, the sequence 1-2-3 corresponds to the sequence "blue"-"green"-"red", the sequence 2-0-1 corresponds to the sequence "green"-"orange"-"blue" and so forth. In some implementations, a prompt may include a written word, such as "orange." In some implementations, a prompt may include a depiction of an object that is and/or represents "orange." Other implementations are envisioned and may be considered within the scope of this disclosure.

The target prompt component may be configured to obtain and/or determine sequences of prompts, e.g. a target sequence of prompts. In some implementations, a sequence of prompts may correspond to a (target) personal identification sequence. For example, based on an exemplary mapping, a sequence of prompts "blue"-"green"-"red" may correspond to a target personal identification sequence 1-2-3.

The presentation component may be configured to effectuate presentation of prompts to users. In some implementations, such a presentation may be made in accordance with a mapping, e.g. as obtained and/or determined by the mapping component. In some implementations, individual ones of the presented prompts to a particular unidentified user may be associated with individual ones of the user-selectable input options according to a particular mapping. For example, in some implementations, prompts may be presented to a user through the same user interface used for the user-selectable input options. For example, each button on a touchscreen may display a combination of a digit and a prompt in accordance with a mapping, such that, e.g., the first button indicates the number 0 and the word "orange," the second button indicates the number 1 with the word "blue," the third button indicates the number 2 with the word "green," the fourth button indicates the number 3 with the word "red," and so forth.

The audio component may be configured to obtain and/or determine audio files (and/or other electronic representations) comprising sound generated by users (e.g. utterances, sentences, statements, and/or other sounds that can be produced by humans). As used herein, the act or process by a user to generate sound may be referred to as vocalization. In some implementations, the sound may be generated in response to a presentation by the presentation component. In some implementations, one or more audio files (and/or other electronic representations) may be obtained through a microphone.

The prompt authentication component may be configured to make determinations regarding audio files (and/or other electronic representations). For example, the prompt authentication component may be configured to determine whether one or more particular audio files represent a vocalization of one or more prompts, e.g. a target sequence of prompts. For example, the prompt authentication component may be configured to determine whether one or more particular audio files represent a vocalization by a user of a prompt, e.g. "blue." In some implementations, the prompt authentication component may operate based on and/or using speech recognition techniques. In some implementations, speech recognition techniques may be speaker-independent.

The speaker verification component may be configured to make determinations regarding identities of speakers. For example, the speaker verification component may be configured to determine whether one or more particular audio files (and/or other electronic representations) match a particular speaker, a particular speaker model, particular parameters representing audio characteristics, sounds generated by a particular speaker, audio characteristics of sounds generated by a particular speaker, and/or other speaker-specific audio characteristics. In some implementations, the one or more particular audio files may be obtained by the audio component. In some implementations, speaker-specific audio characteristics may be determined prior to a particular user using the system for authentication and verification, e.g. through recorded audio of the particular user generating sounds (e.g. vocalizing a set of words).

The access component may be configured to effectuate grants or denials of access to users. The access component may be configured to effectuate a grant or denial of access to a user based on determinations by, e.g. the prompt authentication component and/or the speaker verification component. For example, a user may be considered unidentified until the user has been authenticated by the prompt authentication component and verified by the speaker verification component. The access component may be configured to grant a user access once the user has been identified. Grants of access may include access to one or more secure systems.

The time component may be configured to enforce restrictions, limitations, and/or other requirements to users seeking a grant of access. For example, in some implementations, a user may be required to provide an audio response (e.g. a vocalization of one or more prompts) within a time limit.

The audio characteristics component may be configured to determine one or more audio characteristics of audio files and/or other representations of sound generated by users. For example, sound generated by a particular user may be used by the audio characteristics component to change, modify, update, and/or otherwise affect speaker-specific audio characteristics associated with the particular user.

These and other objects, features, and characteristics of the described embodiments, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 3A-3B-3C-3D illustrate exemplary user interfaces and/or mappings between user-selectable input options and prompts, in accordance with one or more embodiments.

DETAILED DESCRIPTION

Figure 1:
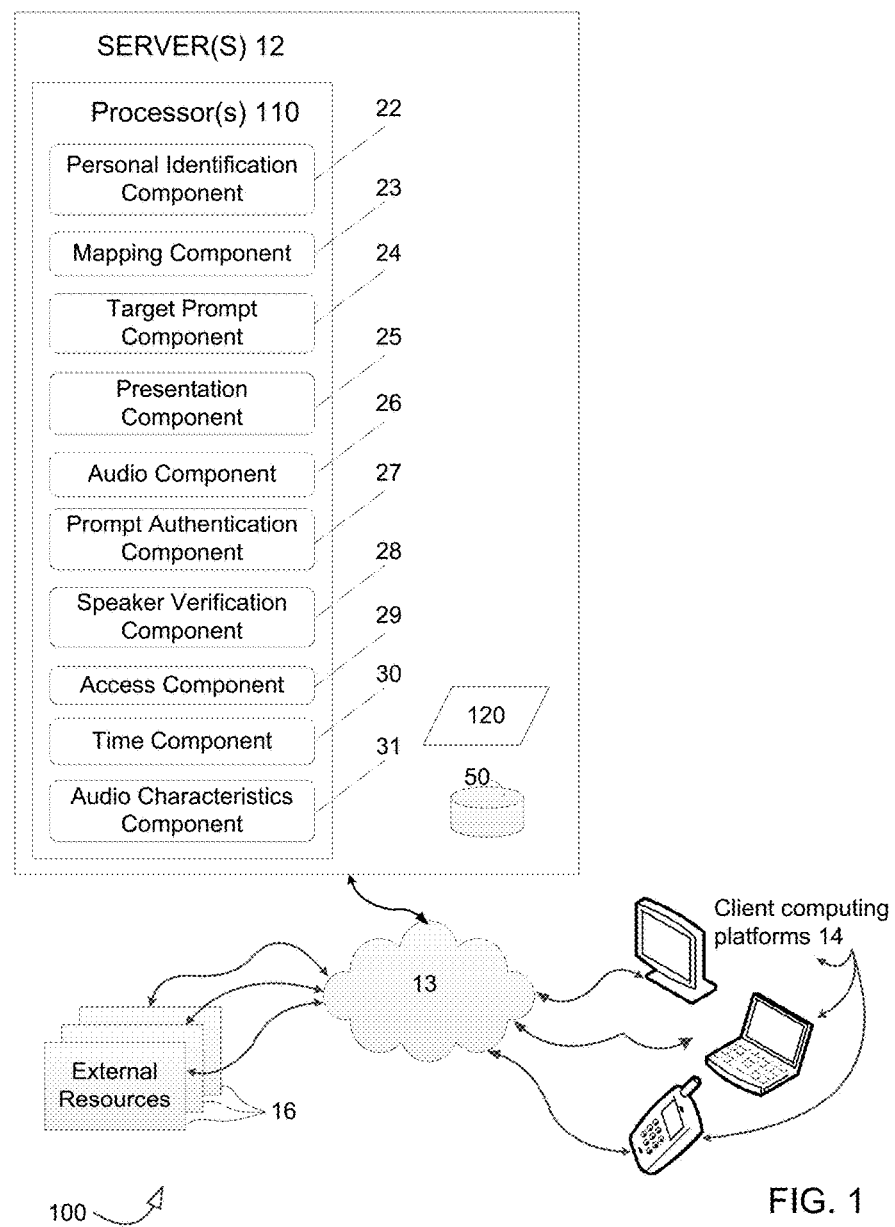
FIG. 1 illustrates an authentication and verification system in accordance with one or more embodiments.

FIG. 1 illustrates an authentication and verification system 100, also referred to as system 100. System 100 may be used in the context of user access to a secure system. System 100 may include one or more servers 12, one or more processors 110, one or more physical storage media 50, one or more computer program components, one or more interfaces 120, and/or other components.

Physical storage media 50 may be configured to store information that represents audio characteristics of sounds generated by users. As used herein, the term "user" may be used interchangeably with the term "speaker." In some implementations, speaker-specific audio characteristics may be determined prior to a particular user using system 100. In some implementations, physical storage media 50 may be configured to store personal identification sequences, including but not limited to personal identification numbers. In some implementations, individual personal identification sequences may be associated with individual users of system 100.

As used herein, the term "authentication" and derivatives thereof are related to the knowledge of a user, e.g. whether the user knows a particular personal identification number or password. As used herein, the term "verification" and derivatives thereof are related to personal biophysical characteristics of a user, e.g. whether the user's voice characteristics match previously recorded and/or determined voice characteristics, or whether the user's biometrics are matching. As used herein, an "unidentified" user refers to a user who is not both authenticated and verified using the authentication and verification described herein.

Server(s) 12 may include physical storage media 50, as depicted in FIG. 1. In some implementations, functionality attributed herein to processor 110 of server 12 or to a computer program component of server 12 may be not limited to server 12, but rather may be provided by resources of client computing platform(s) 14, and/or jointly provided by both server 12 and one or more client computing platforms 14. The depiction in FIG. 1 is not intended to be limiting in any way with regard to the location of any particular functionality described herein. The terms "client computing platform" and "client" may be used interchangeably herein.

Server 12, client computing platforms 14, and/or external resources 16 may be operatively linked via one or more electronic communication links. For example, such electronic communication links may be established, at least in part, via a network 13 such as the Internet and/or other communication networks. It will be appreciated that this is not intended to be limiting, and that the scope of this disclosure includes implementations in which servers 12, client computing platforms 14, and/or external resources 16 may be operatively linked via some other communication media.

The computer program components may include one or more of a personal identification component 22, a mapping component 23, a target prompt component 24, a presentation component 25, an audio component 26, a prompt authentication component 27, a speaker verification component 28, an access component 29, a time component 30, an audio characteristics component 31, and/or other components.

Personal identification component 22 may be configured to obtain and/or determine target personal identification sequences, including but not limited to personal identification numbers. Individual target personal identification sequences may be associated with individual users. As used herein, the term "obtain" (and derivatives thereof) may include active and/or passive retrieval, determination, derivation, transfer, and/or exchange of information, and/or any combination thereof. As used herein, the term "determine" (and derivatives thereof) may include measure, calculate, compute, estimate, approximate, generate, and/or otherwise derive, and/or any combination thereof. As used herein, any association (or correspondency) involving personal identification sequences, users, and/or another entity that interacts with any part of the system, may be a one-to-one association, a one-to-many association, a many-to-one association, and/or a many-to-many association or N-to-M association (note that N and M may be different numbers greater than 1).

Mapping component 23 may be configured to obtain, generate, and/or determine mappings between user-selectable input options (e.g. input options available for selection by users through client computing platforms 14, interfaces 120, and/or other components) and prompts that represent words. By way of non-limiting example, user-selectable input options may include buttons, keys, selectable fields in a user interface (e.g. interface 120), a microphone, and/or other input options available for use or selection by users, including but not limited to input options on a keypad, keyboard, panel, touch screen, and/or other implementation of a user interface. Mappings may be implemented as a set of associations and/or correspondencies. For example, in some implementations, the user-selectable input options include the digits from zero to nine. A mapping may be defined as an association of individual ones of the digits from zero to nine to a particular prompt. In some implementations, one or more prompts may be associated with more than one user-selectable input option. This concept may be referred to as word redundancy. By virtue of word redundancy, a nearby onlooker would not learn the particular user's PIN merely by seeing which user-selectable input options are selected by a user.

Prompts may include visual, graphic, textual, auditory, and/or otherwise sensory representations of words, concepts, numbers, and/or other objects. As an example, a set of prompts may include a set of words including "cat," "dog," "huddle," etc. A mapping may be defined in which the number 1 is associated with the word "cat," 2 with "dog," 3 with "huddle, and so forth. Based on this mapping, the sequence 1-2-3 corresponds to the sequence "cat"-"dog"-"huddle". In some implementations, a prompt may include a written word. By way of non-limiting example, FIG. 3A illustrates a mapping 301 that includes an association between the sequence of user-selectable input options or buttons "1-2-3" and the sequence of prompts "cat"-"dog"-"huddle". Note that the set of user-selectable input options as depicted in FIG. 3A includes the digits from zero to nine, and symbols for "star" and "hash," or "*" and "#", as may be commonly found on telephones. The depicted set of user-selectable input options is not intended to be limiting. In some implementations, depicted prompts may be selectable through a microphone. In other words, the depicted mapping in FIG. 3A may include no buttons or keys, but merely prompt the user to say words, e.g. into a microphone.

In some implementations, mapping component 23 may be configured to obtain, generate, and/or determine new mappings as needed, e.g. for each attempt to authenticate and verify a particular user, and/or for each number, latter, symbol, object, and/or other item in a personal identification sequence.

For example, as illustrated in FIGS. 3B-3C-3D, subsequent attempts to authenticate and verify users using system 100 may use mapping 302 (FIG. 3B), mapping 303 (FIG. 3C), and mapping 304 (FIG. 3D) in turn. Based on these mappings, the same sequence 1-2-3 would respectively correspond to "orange-shimmer-circle" using mapping 302, to "cat-doll-muddy" using mapping 303, and to "flagstaff-bromide-traction" using mapping 304. The particular mappings depicted in FIGS. 3A-3B-3C-3D are not intended to be limiting in any way. In some implementations, mappings may be randomized, at least in part. For example, mapping component 23 may be configured to randomize mappings.

In some implementations, the mappings illustrated in FIGS. 3A-3B-3C-3D may be used in a single attempt to authenticate and verify a particular user using system 100 and using a 4-digit PIN. For example, if the particular user's PIN is 1-2-3-4, the corresponding sequence of prompts, by virtue of using mappings 301, 302, 303, and 304, respectively, would be "cat-shimmer-muddy-bromide." By virtue of the mappings changing frequently, a nearby onlooker/listener would not learn the particular user's PIN merely by listening in, in particular if, in certain mappings, a particular prompt is used to more than one prompt. For example, mapping 304 depicted in FIG. 3D includes the prompts "bromide," "cat," "flagstaff," "circle," "orange," and "traction" twice.

Target prompt component 24 may be configured to obtain and/or determine sequences of prompts, e.g. a target sequence of prompts. In some implementations, a sequence of prompts may correspond to a (target) personal identification sequence. For example, referring to FIG. 3A, according to mapping 301, a sequence of prompts "cat"-"dog"-"huddle" may correspond to a target personal identification sequence 1-2-3.

Presentation component 25 may be configured to effectuate presentation of prompts to users. In some implementations, such a presentation may be made in accordance with a mapping, e.g. as obtained and/or determined by mapping component 24. In some implementations, individual ones of the presented prompts to a particular unidentified user may be associated with individual ones of the user-selectable input options according to a particular mapping. For example, in some implementations, prompts may be presented to a user through interface 120. For example, each field on an electronic screen may display a combination of a digit and a prompt in accordance with a mapping. By way of non-limiting example, FIG. 3A illustrates that the first field may indicate the number 1 and the word "cat," the second field may indicate the number 2 with the word "dog," the third field may indicate the number 3 with the word "huddle," and so forth. Note that FIGS. 3A-3B-3C-3D illustrate mappings between user-selectable input options and prompts, as well as one or more user interfaces (e.g. interface 120) that may be used by users to provide and/or enter user-selectable input options, including but not limited to vocalizations of prompts. In some implementations, presentation component 25 may be configured to include animations in the presentation of prompts. For example, the displayed prompt may disappear gradually (e.g. by removing some letters at a time and/or replacing some letters with other characters), e.g. in response to receiving a user-selectable input option. For example, as soon as a user provides a first user-selectable input option, presentation component 25 may be configured to change, animate, and/or remove a first set of displayed prompts in preparation for the next character in a target personal identification sequence.

Audio component 26 may be configured to obtain and/or determine audio files (and/or other electronic representations) comprising sound provided, entered, and/or otherwise generated by users. In some implementations, the sound may be generated in response to a presentation by presentation component 25. In some implementations, one or more audio files (and/or other electronic representations) may be obtained through a microphone. For example, in response to a presentation of a particular mapping, a user may say a sequence of words that correspond to a personal identification sequence. For example, referring to FIG. 3A, according to mapping 301, a target personal identification sequence 1-2-3 may correspond to a sequence of prompts "cat"-"dog"-"huddle". Instead of entering or saying "1-2-3," a particular user may authenticate (or initiate authentication) by saying the words "cat"-"dog"-"huddle". Audio component 26 may be configured to obtain one or more audio files comprising sound generated by the particular user saying "cat"-"dog"-"huddle". A nearby onlooker would not learn the particular user's PIN by watching the particular user use system 100. By virtue of the mappings changing frequently, a nearby onlooker would also not learn the particular user's PIN merely by listening in.

As used herein, the term "file" may refer to an electronic audio stream, a separate electronic file or document, and/or any part, fragment, and/or section thereof. An audio file may be associated with one or more speakers. In some implementations, individual audio files may have 1-to-1 associations with individual speakers. A set of audio files, associated with a set of speakers may be used as and/or referred to as a training set or training data. Training data may be used to train system 100, e.g. to classify a feature, audio parameter, audio characteristic, individual speaker, and/or any combination thereof.

Prompt authentication component 27 may be configured to make determinations regarding audio files (and/or other electronic representations). For example, prompt authentication component 27 may be configured to determine whether one or more particular audio files (e.g. as obtained and/or determined by audio component 26) represent a vocalization of one or more prompts, e.g. a target sequence of prompts. For example, prompt authentication component 27 may be configured to determine whether one or more particular audio files represent a vocalization by a user of a prompt, e.g. "cat," or a sequence of prompts, e.g. "cat"-"dog"-"huddle". In some implementations, prompt authentication component 27 may operate based on and/or using speech recognition techniques. In some implementations, speech recognition techniques may be speaker-independent. In some implementations, prompt authentication component 27 may be configured to make a determination per prompt whether one or more particular audio files represent a vocalization by a user of a particular prompt. In some implementations, prompt authentication component 27 may be configured to made a determination per prompt based on speaker-dependent models, e.g. using speaker-verification techniques in combination with previously recorded audio samples for a speaker.

For example, in some implementations, prompt authentication component 27 may be configured to determine a likelihood that a particular vocalization matches a particular prompt. For example, in some implementations, prompt authentication component 27 may be configured to determine a similarity between a particular vocalization and one or more prompts. In some implementations, prompt authentication component 27 may not need to perform speech recognition for a large set of possible words, but rather may be optimized to perform speech recognition for a small set of possible words, e.g. the set of words that correspond to the set of prompts used for a mapping by mapping component 23 (or a limited set of words used by mapping component 23 to obtain, generate, and/or determine a mapping). Such a limited set of words may be referred to as a codebook. The codebook for a particular user need not be static, but rather may change over time. For example, certain words may be removed from the codebook and/or added to the codebook. In some implementations, speech recognition techniques involve probabilities of a match or mismatch, rather than certainties. For this reason, determinations based on speech recognition techniques may interchangeably be referred to as estimations.

Speaker verification component 28 may be configured to make determinations regarding identities of speakers. For example, speaker verification component 28 may be configured to determine whether one or more particular audio files (and/or other electronic representations) match a particular speaker, a particular speaker model, particular parameters representing audio characteristics, sounds generated by a particular speaker, audio samples generated by a particular speaker, audio characteristics of sounds generated by a particular speaker, and/or other speaker-specific audio characteristics. In some implementations, the one or more particular audio files may be obtained by audio component 26. In some implementations, speaker-specific audio characteristics may be determined prior to a particular user using system 100 for authentication and verification, e.g. through recorded audio of the particular user generating sounds (e.g. vocalizing a set of words). In some implementations, speaker-specific audio characteristics may be determined for a set of users of system 100, a set of actual people, a set of account holder, and/or other speakers.

In some implementations, speaker verification component 28 may be configured to assess, determine, estimate, confirm, and/or otherwise reach a decision on whether a particular recorded audio file (or a particular speaker model) appears to (and/or are deemed to) represent and/or match a known speaker, and/or which known speaker in particular. In some implementations, speaker verification component 28 may be configured to assess, determine, estimate, confirm, and/or otherwise reach a decision on whether an unidentified speaker (represented by an audio file including sound generated by the unidentified speaker) is and/or appears to be the same person as a known speaker (represented e.g. by a speaker model).

In some implementations, operations by speaker verification component 28 may be performed based on one or more similarity scores and/or other speaker verification techniques (in particular for speaker-dependent analysis and/or user-specific analysis). For example, an unidentified speaker may be assessed as being the same person as a known speaker if their respective similarity score is higher than a threshold. In some implementations, the particular similarity score (for example after normalizing and/or calibration) may need to surpass a minimum threshold level of similarity. In some implementations, the particular similarity score may need to outrank and/or outscore the one or more next closest similarity scores by at least a specific predetermined factor. Other tests based on the similarity scores, as well as combinations of multiple such tests, are contemplated within the scope of this disclosure. The usage of similarity scores is exemplary, and not intended to be limiting.

In some implementations, speaker verification techniques used by system 100 may involve assessing and/or otherwise reaching a decision on whether a particular speaker is the same person as any of a set of identified speakers. Sound generated by identified speakers may be stored in recorded audio files.

Access component 29 may be configured to effectuate grants or denials of access to users. Access component 29 may be configured to effectuate a grant or denial of access to a user based on determinations by, e.g. prompt authentication component 27, speaker verification component 28, and/or other components of system 100. For example, in some implementations, a user may be considered unidentified until the user has been authenticated by prompt authentication component 27 and verified by speaker verification component 28. Access component 29 may be configured to grant a user access once the user has been identified. Grants of access may include access to one or more secure systems. For example, access may include physical or virtual access to a certain area, a restricted area, certain features, certain transactions, a secure website, and so forth, and/or any combination thereof.

Time component 30 may be configured to enforce restrictions, limitations, and/or other requirements to users seeking a grant of access. For example, in some implementations, a user may be required to provide an audio response (e.g. a vocalization of one or more prompts) within a time limit. For example, in some implementations, time component 30 may be configured to require a user to provide multiple prompts at a certain pace, tempo, and/or rhythm. In some implementations, a required tempo may be indicated visually, e.g. using interface 120. In some implementations, certain aspects of speech recognition technology and/or speaker verification technology, including but not limited to word boundary detection, may be made easier, simpler, better, and/or no longer needed by virtue of the user providing individual words or phrases at a predetermined and/or known pace, tempo, and/or rhythm. In some implementations, certain aspects of speech recognition technology may be made easier, simpler, better, and/or no longer needed by virtue of using a limited codebook covering a restricted set of prompts instead of a much larger cookbook as may be needed for common speech recognition.

Audio characteristics component 31 may be configured to determine one or more audio characteristics of audio files and/or other representations of sound generated by users. For example, sound generated by a particular user may be used by audio characteristics component 31 to change, modify, update, and/or otherwise affect speaker-specific audio characteristics associated with the particular user. In some implementations, a set of files representing audio of a particular user generating sounds may be augmented by adding new files representing audio of a previous user deemed to match the particular user. For example, audio characteristics component 31 may be configured to add new files to the codebook of a particular user.

Figure 5:
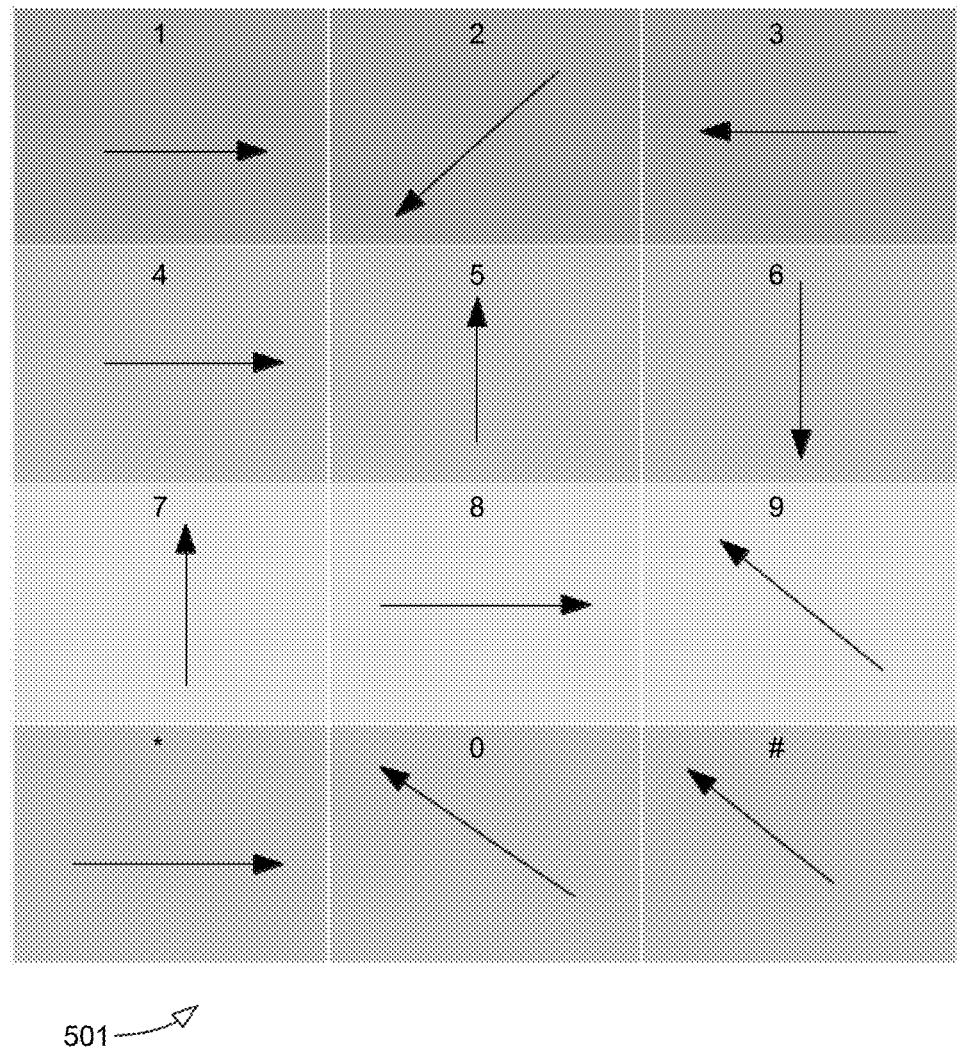
FIG. 5 illustrates an exemplary user interface and/or redirection mapping, in accordance with one or more embodiments.

In some implementations, mapping component 23 may be configured to obtain, generate, and/or determine redirection mappings for user-selectable input options (e.g. input options available for selection by users through client computing platforms 14, interfaces 120, and/or other components). A redirection mapping redirects a user from one user-selectable input option or prompt to another user-selectable input option or prompt. In some implementations, a newly generated redirection mapping may be presented to a user for each character in a target personal identification sequence. By way of non-limiting example, FIG. 5 illustrates a redirection mapping 501. For example, redirection mapping is presented to a user briefly, prior to presentation of, e.g. the user interface of FIG. 3A. Assume that the user's target PIN is 1-2-3. The redirection mapping instructs the user, based on the direction of the arrow associated with number 1, to say "dog" instead of "cat" (without redirection). For the next prompt, the redirection mapping instructs the user, based on the direction of the arrow associated with number 2, to say "orange" instead of "dog" (without redirection). For the next prompt, the redirection mapping instructs the user, based on the direction of the arrow associated with number 3, to say "dog" instead of "huddle" (without redirection). Note that a new redirection mapping may be used between prompts.

Interface 120 may be configured to provide an interface between system 100 and a user through which the user can provide and/or receive information. This enables data, results, and/or instructions and any other communicable items, collectively referred to as "information," to be communicated between the user and system 100. A non-limiting example of information that may be conveyed to a subject is one or more prompts. Examples of interface devices suitable for inclusion in interface 120 include a keypad, buttons, switches, a keyboard, knobs, levers, a display screen, a touch screen, speakers, a microphone, an indicator light, an audible alarm, and a printer. Information may be provided to the subject by interface 120 in the form of auditory signals, visual signals, tactile signals, and/or other sensory signals.

By way of non-limiting example, interface 120 may include a light source capable of emitting light. The light source may include, for example, one or more of at least one LED, at least one light bulb, a display screen, and/or other sources. Interface 120 may control the light source to emit light in a manner that conveys to the subject information related to operation of system 100.

It is to be understood that other communication techniques, either hard-wired or wireless, are also contemplated herein as interface 120. For example, in one embodiment, interface 120 may be integrated with a removable storage interface provided by physical storage media 50. In this example, information is loaded into system 100 from removable storage (e.g., a smart card, a flash drive, a removable disk, etc.) that enables the user(s) to customize the implementation of system 100. Other exemplary input devices and techniques adapted for use with system 100 as interface 120 include, but are not limited to, an RS-232 port, RF link, an IR link, modem (telephone, cable, Ethernet, internet or other). In short, any technique for communicating information with system 100 is contemplated as interface 120.

The computer program components of system 100 may be configured to enable a user of system 100 to interface with system 100 and/or external resources 16, for example through the client computing platforms 14. Server 12 may include communication lines, or ports to enable the exchange of information with a network 13 and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

By way of non-limiting example, client computing platforms 14 may include one or more of a desktop computer, a laptop computer, a handheld computer, a NetBook, a Smartphone, a tablet, a mobile computing platform, a gaming console, a television, a device for streaming internet media, and/or other computing platforms.

In some implementations, interaction with system 100 may be accomplished through web pages, (mobile) applications, apps, stand-alone applications, desktop applications, and/or other types of software applications capable of interacting with one or more networks, for example the internet. As used herein, content provided through any type of software application capable of interacting with a network may be referred to as a web page (including, but not limited to, mobile applications or "apps").

Web pages may be rendered, interpreted, and/or displayed for presentation using a computing platform, such as a client computing platform 14. As used herein, displaying information through a mobile application—or app—is included in the term presentation. Presentation of web pages may be supported through a display, screen, monitor of the computing platform, and/or projection by the computing platform. Web pages may be accessible from a local computing platform 14 (e.g. not currently connected to the internet) and/or hosted by a remote web server (e.g. connected to the internet and/or one or more other networks). Web pages may be accessed through a browser software application being executed on a computing platform.

As used herein, mobile applications may be included in the term browser software application. The browser software application may be configured to render, interpret, and/or display one or more web pages for presentation using a computing platform. A set of linked and/or organized web pages may form a website. A website may include a set of related and/or linked web pages hosted on one or more web servers and accessible via one or more networks, e.g. including the internet.

External resources 16 may include sources of information, audio files, speaker models, speech recognition technology, speaker verification techniques, similarity scores, hosts and/or providers of computing environments and/or virtual environments outside of system 100, external entities participating with system 100, and/or other resources. In some implementations, some or all of the functionality attributed herein to external resources 16 may be provided by resources included in system 100.

Referring to FIG. 1, server(s) 12 and client computing platform(s) 14 may include physical storage media 50 (interchangeably referred to herein as "physical storage media"). Physical storage media 50 may comprise physical storage media that electronically stores information. The functionality of physical storage media 50 may be similar between different instantiations, even if the stored information may be different. The storage of physical storage media 50 may include one or both of system storage that is provided integrally (i.e., substantially non-removable) and/or removable storage that is removably connectable to server(s) 12 and/or client computing platform(s) 14 via, for example, a port (e.g., a USB port, a FireWire™ port, etc.) or a drive (e.g., a disk drive, etc.). Physical storage media 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Physical storage media 50 may refer to RAM, SRAM, DRAM, eDRAM, SDRAM, volatile memory, non-volatile memory, and/or other types of electronic memory, in particular non-transitive physical storage media. Physical storage media 50 may include one or more virtual storage resources (e.g., cloud storage, a virtual private network, and/or other virtual storage resources). Physical storage media 50 may store software algorithms, information determined by processor(s) 110, information received from components of system 100, and/or other information that enables server(s) 12 and/or client computing platform(s) 14 to function as described herein.

Server(s) 12 and client computing platform(s) 14 may include processor(s) 110. Processor(s) 110 may be configured to provide information-processing capabilities in server(s) 12 and/or client computing platform(s) 14. The functionality of processor(s) 110 may be similar between different instantiations, even if the processing capabilities may be different. Processor(s) 110 may include one or more of a digital processor, an analog processor, a digital circuit designed to process information, an analog circuit designed to process information, and/or other mechanisms for electronically processing information. Although processor(s) 110 is shown in FIG. 1 as a single entity, this is for illustrative purposes only. In some embodiments, processor(s) 110 may include a plurality of processing units. These processing units may be physically located within the same device, or processor(s) 110 may represent processing functionality of a plurality of devices operating in coordination. The processor(s) 110 may be configured to execute components 22-31, and/or other components. Processor 110 may be configured to execute components 22-31, and/or other components by software; hardware; firmware; some combination of software, hardware, and/or firmware; and/or other mechanisms for configuring processing capabilities on processor(s) 110.

It should be appreciated that although components 22-31 are illustrated in FIG. 1 as being co-located within the same processing unit, one or more of components 22-31 may be located remotely from the other components. The description of the functionality provided by the different components 22-31 described herein is for illustrative purposes, and is not intended to be limiting, as any of components 22-31 may provide more or less functionality than is described. For example, one or more of components 22-31 may be eliminated, and some or all of its functionality may be provided by other ones of components 22-31. As another example, processor 110 may be configured to execute one or more additional components that may perform some or all of the functionality attributed herein to one of components 22-31.

It is noted that the division of functionality between server(s) 12 and client computing platform(s) 14 is not intended to be limited by this disclosure. Functions described in relation with server(s) 12 may be performed and/or shared by one or more other components of system 100, including client computing platform(s) 14, and vice versa.

Figure 2:
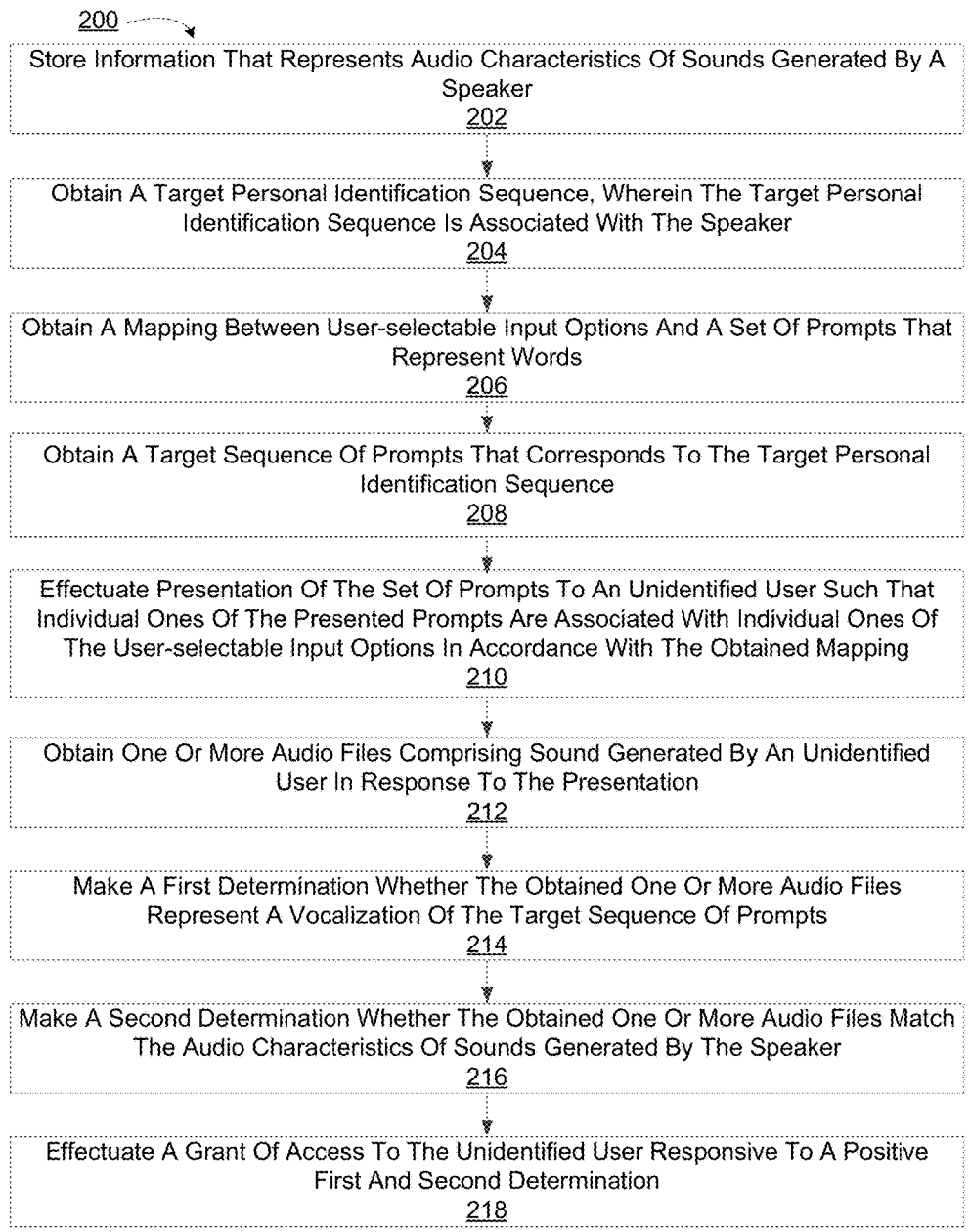
FIG. 2 illustrates a method to implement an authentication and verification system in accordance with one or more embodiments.
Figure 4:
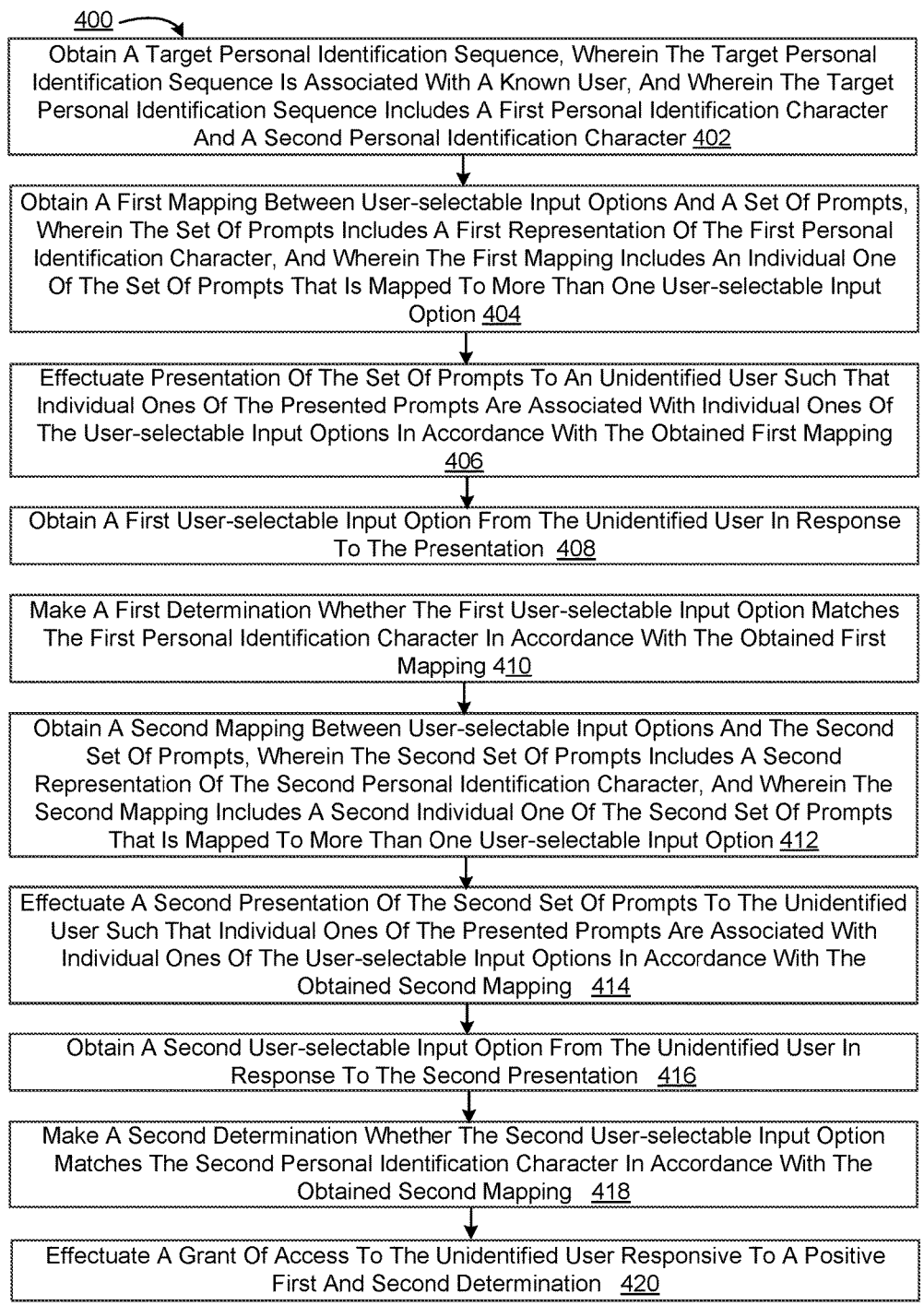
FIG. 4 illustrates a method to implement authentication in accordance with one or more embodiments.

FIG. 2 illustrates a method 200 for implementing an authentication and verification system, in accordance with one or more embodiments. FIG. 4 illustrates a method 400 for implementing authentication, in accordance with one or more embodiments. The operations of methods 200 and 400 presented below are intended to be illustrative. In some embodiments, methods 200 and 400 may be accomplished with one or more additional operations not described, and/or without one or more of the operations discussed. Additionally, the order in which the operations of methods 200 and 400 are illustrated in FIG. 2 and FIG. 4 and described below is not intended to be limiting.

In some embodiments, methods 200 and 400 may be implemented in one or more processing devices (e.g., a digital processor, an analog processor, a controller, a digital circuit designed to process information, an analog circuit designed to process information, and/or other mechanisms for electronically processing information). The one or more processing devices may include one or more devices executing some or all of the operations of methods 200 and 400 in response to instructions stored electronically on an physical storage media medium. The one or more processing devices may include one or more devices configured through hardware, firmware, and/or software to be specifically designed for execution of one or more of the operations of methods 200 and 400.

Referring to FIG. 2, at an operation 202, information is stored that represents audio characteristics of sounds generated by a speaker. In some embodiments, operation 202 is performed by physical storage media the same as or similar to physical storage media 50 (shown in FIG. 1 and described herein).

At an operation 204, a target personal identification sequence is obtained. The target personal identification sequence is associated with the speaker. In some embodiments, operation 204 is performed by a personal identification component the same as or similar to personal identification component 22 (shown in FIG. 1 and described herein).

At an operation 206, a mapping is obtained between user-selectable input options and a set of prompts that represent words. In some embodiments, operation 206 is performed by a mapping component the same as or similar to mapping component 23 (shown in FIG. 1 and described herein).

At an operation 208, a target sequence of prompts is obtained that corresponds to the target personal identification sequence. In some embodiments, operation 208 is performed by a target prompt component the same as or similar to target prompt component 24 (shown in FIG. 1 and described herein).

At an operation 210, presentation is effectuated of the set of prompts to an unidentified user such that individual ones of the presented prompts are associated with individual ones of the user-selectable input options in accordance with the obtained mapping. In some embodiments, operation 210 is performed by a presentation component the same as or similar to presentation component 25 (shown in FIG. 1 and described herein).

At an operation 212, one or more audio files comprising sound generated by an unidentified user are obtained in response to the presentation. In some embodiments, operation 212 is performed by an audio component the same as or similar to audio component 26 (shown in FIG. 1 and described herein).

At an operation 214, a first determination is made whether the obtained one or more audio files represent a vocalization of the target sequence of prompts. In some embodiments, operation 214 is performed by a prompt authentication component the same as or similar to prompt authentication component 27 (shown in FIG. 1 and described herein).

At an operation 216, a second determination is made whether the obtained one or more audio files match the audio characteristics of sounds generated by the speaker. In some embodiments, operation 216 is performed by a speaker verification component the same as or similar to speaker verification component 28 (shown in FIG. 1 and described herein).

At an operation 218, a grant of access is effectuated to the unidentified user responsive to a positive first and second determination. In some embodiments, operation 218 is performed by an access component the same as or similar to access component 29 (shown in FIG. 1 and described herein).

Referring to FIG. 4, at an operation 402, a target personal identification sequence is obtained. The target personal identification sequence is associated with a known user. The target personal identification sequence includes a first personal identification character and a second personal identification character. In some embodiments, operation 402 is performed by a personal identification component the same as or similar to personal identification component 22 (shown in FIG. 1 and described herein).

At an operation 404, a first mapping is obtained between user-selectable input options and a set of prompts. The set of prompts includes a first representation of the first personal identification character. The first mapping includes an individual one of the set of prompts that is mapped to more than one user-selectable input option. In some embodiments, operation 404 is performed by a mapping component the same as or similar to mapping component 23 (shown in FIG. 1 and described herein).

At an operation 406, presentation of the set of prompts is effectuated to an unidentified user such that individual ones of the presented prompts are associated with individual ones of the user-selectable input options in accordance with the obtained first mapping. In some embodiments, operation 406 is performed by a presentation component the same as or similar to presentation component 25 (shown in FIG. 1 and described herein).

At an operation 408, a first user-selectable input option is obtained from the unidentified user in response to the presentation. In some embodiments, operation 408 is performed by an audio component the same as or similar to audio component 26 (shown in FIG. 1 and described herein). In some embodiments, the first user-selectable input option may be received through a non-auditory input mechanism, including but not limited to a keypad.

At an operation 410, a first determination is made whether the first user-selectable input option matches the first personal identification character in accordance with the obtained first mapping. In some embodiments, operation 410 is performed by a prompt authentication component the same as or similar to prompt authentication component 27 (shown in FIG. 1 and described herein).

At an operation 412, a second mapping is obtained between user-selectable input options and a second set of prompts. The second set of prompts includes a second representation of the second personal identification character. The second mapping includes a second individual one of the second set of prompts that is mapped to more than one user-selectable input option. In some embodiments, operation 412 is performed by a mapping component the same as or similar to mapping component 23 (shown in FIG. 1 and described herein).

At an operation 414, a second presentation of the second set of prompts is effectuated to the unidentified user such that individual ones of the presented prompts are associated with individual ones of the user-selectable input options in accordance with the obtained second mapping. In some embodiments, operation 414 is performed by a presentation component the same as or similar to presentation component 25 (shown in FIG. 1 and described herein).

At an operation 416, a second user-selectable input option is obtained from the unidentified user in response to the second presentation. In some embodiments, operation 416 is performed by an audio component the same as or similar to audio component 26 (shown in FIG. 1 and described herein). In some embodiments, the second user-selectable input option may be received through a non-auditory input mechanism, including but not limited to a keypad.

At an operation 418, a second determination is made whether the second user-selectable input option matches the second personal identification character in accordance with the obtained second mapping. In some embodiments, operation 418 is performed by a prompt authentication component the same as or similar to prompt authentication component 27 (shown in FIG. 1 and described herein).

At an operation 420, a grant of access to the unidentified user is effectuated responsive to a positive first and second determination. In some embodiments, operation 420 is performed by an access component the same as or similar to access component 29 (shown in FIG. 1 and described herein).

The present invention, in accordance with one or more various implementations, is described above in detail with reference to the accompanying figures. The drawings are provided for purposes of illustration only and merely depict exemplary implementations. These drawings are provided to facilitate the reader's understanding of the systems and methods described herein and shall not be considered limiting of the breadth, scope, or applicability of any of the claims.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment and/or claim can be combined with one or more features of one or more other embodiments and/or claims.

What is claimed is:

1. A computing system for implementing an authentication and verification system, the system comprising:
   physical storage media configured to store information that represents audio characteristics of sounds generated by a speaker; and
   one or more physical processors configured to execute computer program components, wherein the computer program components are configured to:
      obtain a target personal identification sequence, wherein the target personal identification sequence is associated with an unidentified user;
      obtain an input mapping between user-selectable input options and a set of prompts that represent words;
      obtain a target sequence of prompts that corresponds to the target personal identification sequence;
      obtain a redirection mapping and effectuate presentation of the redirection mapping to the unidentified user prior to effectuating presentation of the set of prompts;
      effectuate a presentation of the set of prompts to the unidentified user such that individual ones of the presented set of prompts are associated with individual ones of the user-selectable input options in accordance with the obtained input mapping;
      obtain one or more audio files comprising sound generated by the unidentified user in response to the presentation;
      make a first determination whether the obtained one or more audio files represent a vocalization of the target sequence of prompts based on a reversal of a redirection in accordance with the redirection mapping;
      automatically authenticate the unidentified user responsive to a positive first determination;
      make a second determination whether the obtained one or more audio files match the audio characteristics of the sounds generated by the speaker;
      automatically verify the unidentified user responsive to a positive second determination; and
      effectuate a grant of access to the unidentified user responsive to authenticating and verifying the unidentified user.

2. The system of claim 1, wherein the computer program components are further configured to enforce a limited amount of time for the unidentified user to provide the one or more audio files comprising the sound.

3. The system of claim 1, wherein the presentation includes information to guide pacing of the vocalization.

4. The system of claim 1, wherein the input mapping includes an individual one of the set of prompts that is mapped to more than one user-selectable input option such that the unidentified user is presented with two or more different user-selectable input options bearing a same prompt of the set of prompts at a same point in time.

5. The system of claim 1, wherein, during a single authentication transaction, the input mapping is re-generated, and a second presentation of a new set of prompts is effectuated based on the re-generated input mapping, in-between obtainment of a first sound generated by the unidentified user and a second sound generated by the unidentified user, the first and second sounds representing vocalizations of individual prompts.

6. The system of claim 1, wherein the target personal identification sequence includes alphanumeric symbols.

7. The system of claim 1, wherein the target personal identification sequence includes numerical digits in a range from zero to nine.

8. A method for implementing authentication and verification by an authentication and verification system comprising one or more physical processors, the method comprising:
   obtaining a target personal identification sequence, wherein the target personal identification sequence is associated with an unidentified user;
   obtaining an input mapping between user-selectable input options and a set of prompts that represent words;
   obtaining a target sequence of prompts that corresponds to the target personal identification sequence;
   obtaining a redirection mapping and effectuating presentation of the redirection mapping to the unidentified user prior to effectuating presentation of a set of prompts;
   effectuating a presentation of the set of prompts to the unidentified user such that individual ones of the presented set of prompts are associated with individual ones of the user-selectable input options in accordance with the obtained input mapping;
   obtaining one or more audio files comprising sound generated by the unidentified user in response to the presentation;
   making a first determination whether the obtained one or more audio files represent a vocalization of the target sequence of prompts based on a reversal of a redirection in accordance with the redirection mapping;
   automatically authenticating the unidentified user responsive to a positive first determination;
   making a second determination whether the obtained one or more audio files match one or more audio characteristics of sounds generated by the unidentified user;
   automatically verifying the unidentified user responsive to a positive second determination; and
   effectuating a grant of access to the unidentified user responsive to authenticating and verifying the unidentified user.

9. The method of claim 8, wherein the set of prompts comprise visual prompts.

10. The method of claim 8, wherein individual ones of the set of prompts include one or more words.

11. The method of claim 8, wherein the input mapping is generated at least in part randomly, and wherein the input mapping is generated prior to the presentation of the set of prompts.

12. The method of claim 8, wherein the user-selectable input options correspond to buttons on a keypad.

13. The method of claim 8, wherein the presentation of the set of prompts includes display of the words represented by the set of prompts on an electronic display device.

14. The method of claim 8, wherein obtaining the one or more audio files is accomplished through a microphone disposed near the unidentified user.

15. One or more non-transitory computer storage media encoded with instructions that when executed by one or more data processing devices cause the one or more data processing devices to perform operations comprising:
   obtaining a target personal identification sequence, wherein the target personal identification sequence is associated with an unidentified user;
   obtaining an input mapping between user-selectable input options and a set of prompts that represent words;
   obtaining a target sequence of prompts that corresponds to the target personal identification sequence;

obtaining a redirection mapping and effectuating presentation of the redirection mapping to the unidentified user prior to effectuating presentation of a set of prompts;

effectuating a presentation of the set of prompts to the unidentified user such that individual ones of the presented set of prompts are associated with individual ones of the user-selectable input options in accordance with the obtained input mapping;

obtaining one or more audio files comprising sound generated by the unidentified user in response to the presentation;

making a first determination whether the obtained one or more audio files represent a vocalization of the target sequence of prompts based on a reversal of a redirection in accordance with the redirection mapping;

automatically authenticating the unidentified user responsive to a positive first determination;

making a second determination whether the obtained one or more audio files match one or more audio characteristics of sounds generated by the unidentified user;

automatically verifying the unidentified user responsive to a positive second determination; and effectuating a grant of access to the unidentified user responsive to authenticating and verifying the unidentified user.

16. The non-transitory computer storage medium of claim 15, wherein the first determination is based on speech-recognition techniques.

17. The non-transitory computer storage medium of claim 15, wherein making the second determination is based on speaker-verification techniques.

18. The non-transitory computer storage medium of claim 15, wherein the grant of access allows the unidentified user access to restricted operations and/or transactions.

19. The non-transitory computer storage medium of claim 15, wherein the grant of access allows the unidentified user physical access to a restricted area.

20. The non-transitory computer storage medium of claim 15, wherein the set of prompts includes a new prompt that represents a new word, wherein the sounds generated by the unidentified user do not include a representation of a vocalization of the new word.

* * * * *